UNITED STATES PATENT OFFICE 2,405,340

MANUFACTURE OF TETRYL

George Washington Batchelder, Mantua, N. J., assignor to E. I. du Pont de Nemours & Company, Wilmington, Del., a corporation of Delaware No Drawing. Application September 25, 1943, Serial No. 503,839

12 Claims. (Cl. 260—577)

This invention relates to the manufacture of tetryl and particularly to the production of tetryl by the nitration of dimethylaniline solution in sulfuric acid.

This application is a continuation-in-part of my co-pending application Serial No. 466,797 filed November 24, 1942.

Dimethylaniline solution as used herein designates dimethylaniline dissolved in sulfuric acid. By acid ratio as used hereinafter is meant the weight ratio of 100% nitric acid to 100% dimethylaniline.

In the manufacture of tetryl by the methods known to the art, ordinarily dimethylaniline solution is introduced into a nitrating agent, such as nitric acid alone or a mixture of nitric and sulfuric acids, whereby nitration of the aromatic ring takes place and one of the methyl groups attached to the amino nitrogen atom is replaced by an $NO_2$ group, forming tetryl.

In the conventional method of manufacture, this is usually accomplished by introducing the acid into a nitration apparatus in such amount that the nitric acid-dimethylaniline ratio is relatively low; adding dimethylaniline solution until the temperature reaches a definite limit, generally 145° F.; and continuing the nitration at this temperature until all the dimethylaniline solution has been added. This requires about three hours and forty-five minutes when starting with approximately 1,500 pounds of said solution. During this stage of the process, tetryl crystallizes in the nitrator. The nitrated charge is held in the nitrator for some time after all the dimethylaniline solution has been introduced. The charge is then further processed by extracting the tetryl from the spent acid and purifying the crude product. This process and others heretofore employed have not been altogether satisfactory because of the dangers and low productive capacity attending the same.

While most accidents have occurred after a large amount of the tetryl crystallized, said crystallization being promoted by the use of insufficient acid ratios, there is no evidence in the prior art that this fact even has been appreciated.

An object of this invention is a new and improved process for the production of tetryl. Another object is a process of enhanced safety for the manufacture of tetryl. A further object is a method for the production of tetryl characterized by a remarkable increase in productive capacity. These and additional objects of my invention will become apparent on reading this specification.

I have found that these objects are accomplished and the foregoing drawbacks overcome by increasing the parts of mixed acid per part of dimethylaniline used; that is, increasing the nitric acid ratio; heating the mixed acid before introduction into the nitrator; and increasing the temperature of nitration. These objects may be obtained according to the present invention by operating under the foregoing conditions and (1) maintaining the nitration temperature between 150° and 180° F., for instance 170° F., throughout the nitration and feeding the dimethylaniline solution into the nitrator until a substantial portion of the nitric acid has been consumed; (2) or maintaining the nitration temperature between 150° and 180° F. and terminating the reaction by discontinuing the addition of dimethylaniline solution at such time as to leave a larger excess of nitric acid in the nitrator; (3) or keeping the nitration temperature between 150° and 180° F. preferably between 165° and 180° F., until about two-thirds of the dimethylaniline solution has been introduced, and keeping said temperature between 140° and 160° F. during the latter part of the reaction. In the first and third cases, the rate of feed of dimethylaniline solution may be somewhat greater before some of the tetryl crystallizes than thereafter. By operating under these conditions, I am able to hold in solution a substantial amount of the tetryl as it is produced and throughout the remainder of the nitration.

While the acid ratio employed in either of the three cases specified may range preferably from 7 to 12, in any event it will be at least 7.

I have found that the point at which the tetryl begins to crystallize depends primarily upon the temperature and acid ratio employed. Further, I have found that temperatures and rates of dimethylaniline solution feed, which are unsafe subsequent to the time when a portion of the tetryl begins to crystallize, can be employed safely prior to said time. However, the higher of two moderately high temperatures may be the safer, because the time during which solid tetryl is present in the nitrator is diminished.

The following is set forth as an example of the process of my invention hereinabove outlined, which, of course, is not intended to limit the invention, but rather is cited as a specific embodiment thereof. This example gives details sufficient to enable anyone skilled in the art to practice said invention.

One thousand, five hundred and eighty-eight pounds of mixed acid preheated to 155° F. including 1,247 pounds nitric acid, 167 pounds sulfuric acid, and 174 pounds water, is introduced into the nitrator. After the mixed acid has been introduced, the temperature is 135° F., and the agitator is started at 140 R. P. M. A substantially constant and rapid flow of approximately a 10% dimethylaniline solution is begun, and the temperature is brought to and maintained at 160° F. throughout the nitration. The size of the dimethylaniline solution stream, as observed entering the nitrator, is controlled so that about 1,282 pounds is introduced in 33.3 minutes. After approximately 800 pounds of said solution has been added, the agitator speed is increased to 190 R. P. M., which is maintained during the remainder of the nitration. A water cooling system, comprising a water jacket surrounding the nitrator and coils within said nitrator, is used to maintain a constant temperature. When the addition of dimethylaniline solution is complete, nitration is continued for 15 minutes under substantially the same conditions of temperature and agitation, the latter period being referred to as the "cooking period." At this stage of the process, agitation is reduced to 60 R. P. M., and the charge is either drowned in water in the drowning tub, if the spent acid is to be discarded, or cooled and filtered, if said acid is to be recovered. If said charge is drowned, this is done gradually so as to prevent an excessive temperature in the drowning tub. Next, the drowned acid or spent acid is removed from the tetryl and some of the impurities are hydrolyzed by a thorough washing treatment with water. In continuing the process, the washed tetryl is filtered, acetone refined, dried, screened, and packed.

As will be noticed by simple calculation, the acid ratio of the above example is approximately 10. With this ratio, and a temperature of 160° F. substantially all of the tetryl is held in solution throughout the nitration. I find it advantageous to use a nitrating acid, preheated to between 140° and 160° F. containing between 5% and 15% $H_2SO_4$ and between 75% and 82% $HNO_3$.

The dimethylaniline solution in sulfuric acid desirably will contain between 8% and 12% of the former. The rate of addition of said solution may be such that between about 1,000 and 2,000 pounds are added per hour. The nitration mixture may be maintained between 140° and 180° F. for between approximately 10 and 30 minutes after the nitration reaction is substantially complete.

The advantages of my invention are very considerable. By (1) using an acid ratio of at least 7, preferably between 7 and 12, and maintaining the nitration temperature between 150° and 180° F., for instance 170° F., throughout the nitration and feeding the dimethylaniline solution into the nitrator until a substantial portion of the nitric acid has been consumed; (2) or by using an acid ratio between 7 and 12, preferably about 10, and maintaining the nitration temperature between 150° and 180° F., for instance 170° F., and terminating the reaction by discontinuing the addition of dimethylaniline solution while a larger excess of nitric acid remains in the nitrator; (3) or by using an acid ratio of at least 7, preferably between 7 and 12, and maintaining the nitration temperature between 150° and 180° F., desirably between 165° and 180° F., during a substantial portion of the process, for example, until about two-thirds of the dimethylaniline solution has been introduced, and thereafter keeping said temperature between 140° and 160° F. during the latter part of the reaction; I am able to complete the reaction while holding from at least two-thirds to all of the tetryl in solution and to lessen the time of nitration materially, thereby greatly increasing the amount of tetryl per man-hour per nitrator, and simultaneously minimizing the difficulties of the nitration process, particularly the latter part thereof.

The fact that I am able to keep substantially more of the tetryl in solution throughout the nitration than is possible according to the prior art methods even at high temperatures is due to a great extent to my use of high acid ratios and high temperatures. The amount of tetryl which can be maintained dissolved in a given nitrator charge, other conditions being equal, depends upon the acid ratio and temperature employed. Said amount of dissolved tetryl varies directly, up to a given point, with the acid ratio. If practically all of the tetryl is not maintained in solution during the nitration, gases collect in the charge and their escape therefrom is seriously impeded by the layer of crystallized tetryl floating on the charge. This causes difficulties even with temperatures just sufficiently high to render the process commercially feasible, said difficulties occurring particularly during the latter part of the nitration. Obviously the shorter the period during which solid tetryl is present, the safer the operation, in view of the foregoing statements.

According to the present invention, said difficulties are obviated by employing a high acid ratio. As a result of using high acid ratios, the nitration is carried out at higher temperatures without a sacrifice of the improved safety features according to my invention, thereby increasing the output of a given nitrator.

Since it is a known fact that practically all abnormal frothing and foaming, resulting in overflowing the nitrator and quite often producing fires, have occurred toward the end of the nitration, after a substantial part of the tetryl crystallized, the improvements according to my invention will be appreciated.

Although I have described my invention in detail and have therefore utilized certain specific terms and language therein, it is to be understood that the present disclosure is illustrative, rather than restrictive, and that many variations may be made therein which will still be comprised within its scope. For instance, although in the example given the heat of reaction is removed from the nitrator by means of a water jacket and water cooling coils, said heat may be removed by cold air or other cooling means. Also, it is feasible to employ a heating system other than steam. Thus, the speed of the agitator, degree of temperature, and quantity and concentrations of materials used may be varied to a certain extent. Nor is it essential that the mixed acid be heated before introduction into the nitrator, since this may be heated after it has passed to the nitrator. It is to be understood, therefore, that the invention is not limited to any specific form, composition, procedure, or embodiment except as indicated by the appended claims.

I claim:

1. A process of producing tetryl which comprises passing a mixed acid, including sulfuric and nitric acids, into a nitration apparatus; introducing a solution of dimethylaniline in sulfuric acid into said nitrator, the ratio of nitric acid to dimethylaniline being at least 7 to 1; agitating the charge throughout the nitration process; maintaining the nitration temperature between 150° and 180° F. during said process until at least two-thirds of said dimethylaniline solution has been added; and thereafter recovering the tetryl.

2. The process according to claim 1, in which the tetryl is recovered by sufficiently cooling said charge at the end of the nitration to bring about crystallization of the tetryl, and filtering the crystallized tetryl from the spent acid.

3. The process according to claim 1, in which the tetryl is drowned in water before recovery.

4. The process according to claim 1, in which said nitration mixture is maintained between 140° and 180° F. for between 10 and 30 minutes after the nitration reaction is substantially complete.

5. A process of producing tetryl which comprises passing a mixed acid, including sulfuric and nitric acids, into a nitration apparatus; introducing a solution of dimethylaniline in sulfuric acid gradually into said nitrator, the ratio of nitric acid to dimethylaniline being at least 7 to 1; agitating the charge throughout the nitration process; maintaining the temperature of nitration between 150° and 180° F. during said process until at least two-thirds of said dimethylaniline solution has been introduced; reducing the temperature to between 140° and 160° F. and continuing the nitration; and thereafter recovering the tetryl.

6. A process of producing tetryl which comprises passing a mixed acid, including sulfuric and nitric acids, into a nitration apparatus; introducing a solution of dimethylaniline in sulfuric acid into said nitrator at a sufficiently constant rate of flow, the ratio of nitric acid to dimethylaniline being between 7 to 1 and 12 to 1; agitating the charge throughout the nitration process; maintaining the temperature of nitration between 165° and 180° F. until about two-thirds of said dimethylaniline solution has been added; reducing the temperature to between 140° and 160° F. and continuing the nitration; and thereafter recovering said tetryl.

7. A process of producing tetryl which comprises passing a mixed acid, including sulfuric and nitric acids, into a nitration apparatus; introducing a solution of dimethylaniline in sulfuric acid into said nitrator until a substantial portion of the nitric acid has been consumed, the ratio of nitric acid to dimethylaniline being at least 7 to 1; agitating the charge throughout the nitration process; maintaining the temperature of said nitration between 150° and 180° F. throughout the nitration; and thereafter recovering the tetryl.

8. A process of producing tetryl which comprises passing a mixed acid, including sulfuric and nitric acids, into a nitration apparatus; introducing a solution of dimethylaniline in sulfuric acid into said nitrator until a substantial part of the nitric acid has been consumed, the ratio of nitric acid to dimethylaniline being at least 7 to 1; agitating the charge throughout the nitration process; maintaining the temperature of said nitration at 170° F. throughout the nitration; and thereafter recovering the tetryl.

9. A process of producing tetryl which comprises passing a mixed acid, including sulfuric and nitric acides, into a nitration apparatus; introducing a solution of dimethylaniline in sulfuric acid into said nitrator, the ratio of nitric acid to dimethylaniline being between 7 to 1 and 12 to 1; agitating the charge throughout the nitration process; maintaining the temperature of said nitration between 150° and 180° F. throughout the nitration; discontinuing the addition of said dimethylaniline solution while an excess of nitric acid remains in the nitrator; and thereafter recovering the tetryl.

10. A process of producing tetryl which comprises passing a mixed acid, including sulfuric and nitric acids, into a nitration apparatus; introducing a solution of dimethylaniline in sulfuric acid into said nitrator, the ratio of nitric acid to dimethylaniline being about 10 to 1; discontinuing the addition of said dimethylaniline solution while an excess of nitric acid remains in the nitrator; agitating the charge throughout the nitration process; maintaining the temperature of said nitration at 170° F. throughout the nitration reaction, thereby holding substantially all of the tetryl in solution; and thereafter recovering the tetryl.

11. A process of producing tetryl which comprises introducing a preheated mixed acid, including sulfuric and nitric acids, into a nitration apparatus; introducing a solution comprising between 8% and 12% of dimethylaniline in sulfuric acid into said nitrator at a practically constant rate of flow in order to introduce between 1,000 and 2,000 pounds of said solution per hour, the ratio of nitric acid to dimethylaniline being between 7 to 1 and 12 to 1; agitating the nitration mixture throughout the nitration process; maintaining the temperature of said nitration between 150° and 180° F. until at least two-thirds of said dimethylaniline solution has been introduced, reducing the temperature to between 140° and 160° F. and continuing the nitration; drowning said charge in water; and thereafter recovering the tetryl.

12. A process of producing tetryl which comprises introducing approximately 1,600 pounds of a mixed acid preheated to between 140° and 160° F., including between approximately 5% and 15% $H_2SO_4$ and between about 75% and 82% $HNO_3$ into a nitration apparatus; introducing a solution comprising between 8% and 12% of dimethylaniline in sulfuric acid into said nitrator at a sufficiently constant rate of flow so as to introduce between 1,000 and 2,000 pounds of said solution per hour, the ratio of nitric acid to dimethylaniline being at least 7 to 1; agitating the nitration mixture throughout the nitration process; maintaining the nitration temperature between 165° and 180° F. until at least two-thirds of said dimethylaniline solution has been introduced; maintaining said temperature between 140° and 160° F. during the latter part of the nitration; cooling said charge sufficiently to bring about crystallization of the tetryl; and filtering said crystallized tetryl from the waste acid.

GEORGE WASHINGTON BATCHELDER.